(12) United States Patent
Hennecke et al.

(10) Patent No.: US 9,153,233 B2
(45) Date of Patent: Oct. 6, 2015

(54) VOICE-CONTROLLED SELECTION OF MEDIA FILES UTILIZING PHONETIC DATA

(75) Inventors: Marcus Hennecke, Ulm (DE); Gerhard Nüßle, Blaustein (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 1960 days.

(21) Appl. No.: 11/360,034

(22) Filed: Feb. 21, 2006

(65) Prior Publication Data

US 2006/0206327 A1    Sep. 14, 2006

(30) Foreign Application Priority Data

Feb. 21, 2005 (EP) .................................... 05003671

(51) Int. Cl.
G10L 15/187    (2013.01)
G10L 15/22     (2006.01)
G10L 15/26     (2006.01)

(52) U.S. Cl.
CPC .......... *G10L 15/26* (2013.01); *G10H 2240/131* (2013.01)

(58) Field of Classification Search
CPC ....... G10L 15/02; G10L 15/08; G10L 15/187; G10L 15/005; G10L 15/22; G10H 2240/131
USPC ............ 704/235, 246, 251, 270, 275, 8, 255, 704/257; 707/3, 6
See application file for complete search history.

(56) References Cited

U.S. PATENT DOCUMENTS

| | | | |
|---|---|---|---|
| 5,774,859 A | 6/1998 | Houser et al. ................. | 704/275 |
| 5,875,426 A * | 2/1999 | Bahl et al. ..................... | 704/255 |
| 5,884,259 A * | 3/1999 | Bahl et al. ..................... | 704/252 |
| 6,018,708 A * | 1/2000 | Dahan et al. .................. | 704/244 |
| 6,081,780 A * | 6/2000 | Lumelsky ...................... | 704/260 |
| 6,246,672 B1 * | 6/2001 | Lumelsky ...................... | 704/260 |
| 6,434,529 B1 * | 8/2002 | Walker et al. ................. | 704/275 |
| 6,513,010 B1 | 1/2003 | Lewin et al. ............... | 704/270.1 |
| 6,519,562 B1 * | 2/2003 | Phillips et al. ................ | 704/240 |
| 6,564,263 B1 * | 5/2003 | Bergman et al. .............. | 709/231 |
| 6,704,710 B2 * | 3/2004 | Strong .......................... | 704/255 |
| 6,728,681 B2 * | 4/2004 | Whitham ....................... | 704/275 |
| 6,757,652 B1 * | 6/2004 | Lund et al. .................... | 704/254 |
| 6,907,397 B2 * | 6/2005 | Kryze et al. ................... | 704/251 |
| 6,937,983 B2 * | 8/2005 | Romero ........................ | 704/257 |

(Continued)

FOREIGN PATENT DOCUMENTS

GB    2304957 A    3/1997

OTHER PUBLICATIONS

Plus! Voice Command for Windows Media Player, 26 Pages (2001).*

(Continued)

*Primary Examiner* — Martin Lerner
(74) *Attorney, Agent, or Firm* — Artegis Law Group, LLP

(57) ABSTRACT

A voice-controlled data system is providing that has a storage medium for storing media files, the media files having associated file identification data for allowing the identification of the media files, the file identification data including phonetic data having phonetic information corresponding to the file identification data. The phonetic data is supplied to a speech recognition unit that compares the phonetic data to a speech command input into the speech recognition unit. The data system further includes a file selecting unit that selects one of the media files based on the comparison result.

14 Claims, 3 Drawing Sheets

(56) References Cited

U.S. PATENT DOCUMENTS

| | | | |
|---|---|---|---|
| 7,072,686 B1* | 7/2006 | Schrager | 455/556.1 |
| 7,089,188 B2* | 8/2006 | Logan et al. | 704/270 |
| 7,240,003 B2* | 7/2007 | Charlesworth et al. | 704/254 |
| 7,447,635 B1* | 11/2008 | Konopka et al. | 704/275 |
| 7,842,873 B2* | 11/2010 | Gerl et al. | 704/239 |
| 8,106,285 B2* | 1/2012 | Gerl et al. | 704/253 |
| 8,566,091 B2* | 10/2013 | Low et al. | 704/236 |
| 8,666,727 B2* | 3/2014 | Hennecke | 704/8 |
| 2002/0052740 A1* | 5/2002 | Charlesworth et al. | 704/220 |
| 2002/0111805 A1* | 8/2002 | Goronzy et al. | 704/250 |
| 2002/0128813 A1* | 9/2002 | Engelsberg et al. | 704/200.1 |
| 2002/0188447 A1* | 12/2002 | Coon et al. | 704/249 |
| 2003/0158737 A1* | 8/2003 | Csicsatka | 704/273 |
| 2004/0010415 A1* | 1/2004 | Seo et al. | 704/500 |
| 2004/0039570 A1* | 2/2004 | Harengel et al. | 704/232 |
| 2004/0054541 A1* | 3/2004 | Kryze et al. | 704/275 |
| 2005/0043067 A1* | 2/2005 | Odell et al. | 455/569.2 |
| 2005/0114131 A1* | 5/2005 | Stoimenov et al. | 704/251 |
| 2006/0088292 A1* | 4/2006 | Guillen et al. | 386/96 |
| 2006/0100924 A1* | 5/2006 | Tevanian, Jr. | 705/14 |
| 2006/0206331 A1* | 9/2006 | Hennecke et al. | 704/254 |
| 2007/0198273 A1* | 8/2007 | Hennecke | 704/277 |

OTHER PUBLICATIONS

Clemens Drew and Florian Pestoni; Virtual Jukebox Reviving a Classic; Proceedings of the 35$^{th}$ Hawaii International Conference on System Sciences; 2002; 7 pages (unnumbered).

Jean Kumagai; Talk to the Machine; IEEE Spectrum; Sep. 2002; pp. 60-64.

IBM; Data Retrieval Through a Compact Disk Device Having a Speech-Driven Interface; IBM Technical Disclosure Bulletin; vol. 38 No. 01; Jan. 1995; pp. 267-268.

M. Nilsson; ID3 Tag Version 2.4.0—Main Structure; Nov. 1, 2000; pp. 1-11.

* cited by examiner

VOICE-CONTROLLED SELECTION OF MEDIA FILES UTILIZING PHONETIC DATA

CROSS-REFERENCE TO RELATED APPLICATIONS

This application claims priority of European Patent Application No. 05 003 671.4, filed on Feb. 21, 2005, titled VOICE-CONTROLLED DATA SYSTEM, which is incorporated by reference in this application in its entirety.

BACKGROUND

1. Field of the Invention

The invention relates to a voice-controlled data system and to a method for a voice-controlled selection, generation or compilation of media files.

2. Related Art

For many applications, e.g., multimedia systems including audio/video players, users may select audio or video files from a large list of files, e.g., music titles. Furthermore, the use of media files available over a centralized data base usable for a variety of users has become very well known. The download of audio or video files from a communication network, e.g., the Internet, has become a widespread phenomenon due to the fact that systems have been developed that allow the storing of audio and video data files in a compact way by using different compression techniques. In the art, many different formats for storing media data have been developed, e.g., the MP3 format, the AAC format, the WMA format, the MOV format, and the WMV format. For the user, it has become possible to configure a selection of different audio or video files that may be stored on one storage medium.

Additionally, many formats also allow the storing of meta-data corresponding to the media file. In many of these formats, meta-data are provided containing information about the file itself or any other information relating to this file. Such meta-data or meta-information may include data such as the title of the file, allowing the identification of the data, the artist, the year of recording, the genre, the tracks, etc.

Additionally, the voice-controlled operation of multimedia systems is well known in the art. Especially in vehicles, the voice-controlled operation of electronic systems comprising an audio module, a navigation module, a telecommunication module, and/or a radio module is a useful feature for the driver that helps him to focus on the traffic. To this end, speech recognition units are used in which a voice command from the user of the electronic system is detected and phonetic transcriptions of the detected voice command are used for executing the command of the user.

Often times, identification data allowing the identification of the media files includes data in different languages. If an entry is to be selected by speech recognition, a problem arises that neither the language of the intended entry nor the language in which the name of the intended entry is pronounced is known. The fact that the entries of the media files to be selected have names in different languages and that the language of the intended entry is not known complicates the speech recognition process. The phonetic transcriptions can either be generated automatically or they can be searched in large look-up tables containing examples of phonetic transcriptions. With the use of automatically generated phonetic transcriptions the recognition rate of the control command is low, and the use of look-up tables containing phonetic transcriptions is hardly possible when the control command comprises proper names of different languages.

In summary, often the language of the speech command input into the speech recognition unit for selecting one of the media files is not known. This complicates the speech recognition process, in particular when the user pronounces a foreign language name for one file in his own (different) mother language. The control of an electronic system having media files to select one of the files is a difficult task, because the speech recognition system has to recognize the speech input from the user, which may comprise variable vocabulary, e.g., the name or the title of the media file.

Therefore, a need exists for a system that is able to allow for the voice-controlled selection of a media file from a group of several media files containing data in different languages.

SUMMARY

A voice-controlled data system is provided includes phonetic data as part of the file identification data related to a media file. The phonetic data may include different phonetic transcriptions of one term of the file identification data. These different phonetic transcriptions can then consider the possible different pronunciations of the file identification data. The different phonetic transcriptions can, e.g., consider the pronunciation of one term of the file identification data in different mother languages.

The voice-controlled data system includes a storage medium for storing media files, the media files having associated file identification data for allowing the identification of the media files. The file identification data includes phonetic data, where the phonetic data contains phonetic information corresponding or relating to the file identification data.

The inclusion of the phonetic data as part of the file identification data assists the voice-controlled operation of the data system by utilizing the phonetic information in a speech recognition unit capable of comparing the phonetic data to a speech command input into the speech recognition unit. Additionally, a file selecting unit may be provided that selects one of the media files based on the comparison result. Thus, the phonetic information improves the selection of a file output of a plurality of files because the phonetic information included as part of the file identification data may assist with correctly indentifying the speech control command of the user.

The phonetic data may become part of the media file itself or may be included as meta-data. When the phonetic data is part of the media file, the phonetic data, i.e., phonetic representation of the file identification data, always remain with the media files, which may be otherwise easily lost due to the high mobility of the media files and variety of different environments in which the media files are used.

The phonetic information may further include phonetic transcription of at least part of the file identification data. In this regard, when the user wants to select one of the media files, the user may use at least part of the information included in the file identification data, such as the title of the file, or the composer or artist of the file. When the file identification data includes phonetic transcription of at least the title, the artist, the author, or the composer, speech recognition can be improved considerably. The speech recognition unit may then compare the speech command from the user of the system to the phonetic transcription in the file identification data to determine the correct meaning of the speech command of the user since different transcriptions of the terms used to identify the files are associated to the files. The speech recognition unit may then determine the most likely meaning of the speech command by matching the phonetic transcriptions to the acoustic input of the user, and determine the best matching result.

Other systems, methods, features and advantages of the invention will be or will become apparent to one with skill in the art upon examination of the following figures and detailed description. It is intended that all such additional systems, methods, features and advantages be included with in this description, be within the scope of the invention, and be protected by the accompanying claims.

BRIEF DESCRIPTION OF THE FIGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
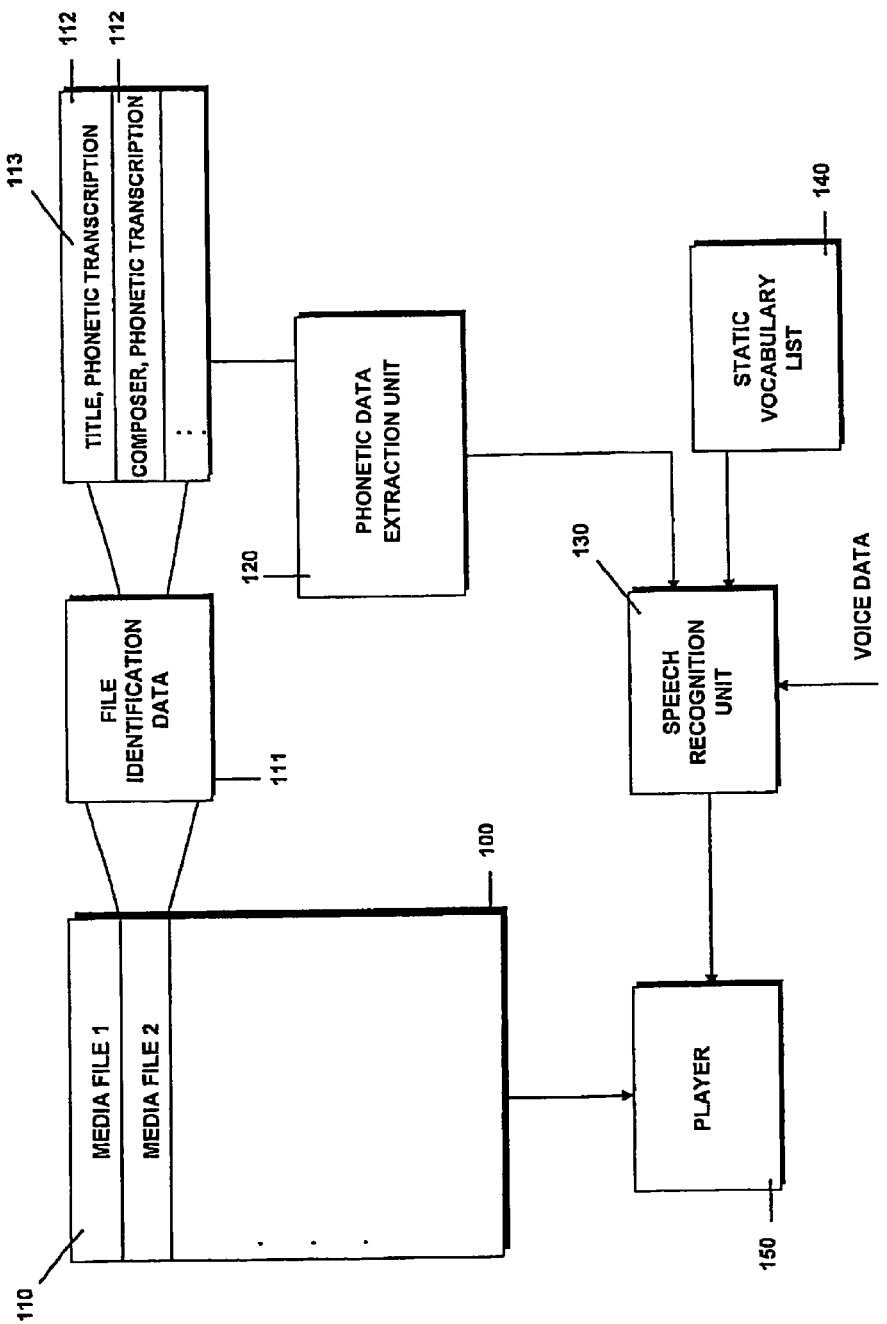
FIG. 1 is a schematic view of one example of one implementation a voice-controlled data system.

In FIG. 1, one example of one implementation of a voice-controlled data system is shown. The data system includes a data storage unit 100 having different media files 110. The media files 110 may comprise audio or video data and may be part of a compact disc or DVD, or any other storage unit, e.g., an SD card or any other medium capable of storing media files. The media files 110 may be stored in a compressed format, may be in MP3 format, AAC format, the MOV format, the WMV format or any other storing format. The voice-controlled data system may be part of any multimedia system, including a multimedia system of a vehicle (not shown). However, it should be understood that the data storage unit 100 may also be incorporated in a non-mobile environment.

The media files 110 may be downloaded from an electronic music store, and thus, the media files 110 may be from different composers or artists. Additionally, the storage unit 100 could include files of different genres, such as jazz, pop, or classic.

For the identification of the different media files 100, each media file 110 may have corresponding file identification data 111. The structure of the file identification data 111 normally depends on the way the media files 110 are stored on the data storage unit 100. Dependent on the data organization or data structure of the media file 110, the file identification data 111 may either be arranged at the end or at the beginning of the data. For example, in the case of media file 110 data in MP3 format, the file identification data 111 are part of a header of the data, as will be described in detail in connection with FIG. 3. Additionally, the file identification data 111 could also be stored in a separate file and could be linked to the media file 110. The file identification data 111 that helps to recognize the media file 110 may include different data sets 112. The data sets 112 may include any information relating to the file, e.g. the title of the file, the artist or composer, the genre of the file, the number of tracks, the number of beats per minute, etc.

The file identification data 111 additionally comprise phonetic transcriptions 113 of at least part of the different data sets. In the example shown, each data set 112 includes phonetic transcription. The data set 112 may comprise the title of the media file and, additionally, the phonetic transcription of the title. Furthermore, the artist or composer and the respective transcription are mentioned. For each piece of information included in the file identification data 111 that helps to identify the media file 110 and that may be used by the user of the system to select the media file 110, phonetic transcriptions are provided.

If the user of the data storage system wants to select one of the media files 110 in the storage unit 100 or several of the media files 110 that he or she may use, commands such as "play [name of the title]", or "play [name of the composer]" may be used. This voice command or voice data may be input into a speech recognition unit 130 that creates a control command that is transmitted to a media file player 150. The media file player 150 selects one of the media files 110 of the data storage unit 100 and reproduces it.

The voice command of the user normally comprises static vocabulary, such as commands, that may include play, stop, go to, forward, backwards, etc. To correctly identify this vocabulary, a static vocabulary list 140 can be provided to identify the static vocabulary and provide the corresponding phonetic transcriptions.

In addition to the static vocabulary, the voice command may also include variable vocabulary depending on the content of the media file, e.g., the title of the media file or the composer of the media file. The speech recognition unit 130 has to recognize the static vocabulary and the variable vocabulary to generate the correct speech control command for the media file player 150. To this end, a phonetic data extraction unit 120 extracts the phonetic transcriptions in the file identification data 111. The speech recognition unit 130 uses the information extracted from the phonetic data extraction unit 120 and the information of the static vocabulary list for comparing the input voice data to the phonetic data of the file identification data 111. Speech recognition units 130 are known in the art. It should be understood that a two step speech recognition approach may be applied in the speech recognition unit 130, especially when the list of media files 110 is large, the first step of recognizing a phoneme sequence. The phoneme sequence is then compared to a list of phonetically transcribed items, which may be a lengthy list, to determine a shorter candidate list of best matching items. In a second step, the candidate list is then supplied to a second part of the speech recognition unit 130, where the most likely entry in the list for the same speech input is determined by matching phonetic acoustic representations of the entries listed in the candidate list to the acoustic input of the voice command.

When the media files comprised in the storage unit 100 are used in an electronic multimedia system, the different phonetic transcriptions of the file identification data may be collected when the system is booted. When the user inputs a voice command into the system, the collected phonetic transcriptions may then be used to determine the exact meaning of the voice command. It is also possible that the media file 110 includes different chapters, such as those found in video files or DVDs. In this case, it is also possible to select different chapters of the media file 110.

Additionally, the voice-controlled system may further provide for the selection of media files 110 stored on a data storage unit 100. In one example of a system implementation, the media files 110 may have associated file identification data 111 that includes phonetic data. When the user wants to select a media file 110, a voice command telling the system which media file should be selected may be used. The speech recognition unit 130 may then determine the best matching phonetic transcription by comparing the input voice data, i.e., the voice command, to data extracted from the media file 110. Once the phonetic data are extracted from the file identification data 111 and supplied to the speech recognition unit 130 as recognition vocabulary the speech recognition unit 130 can then compare the input voice data to the extracted phonetic data and can then generate a corresponding speech control command. A media file 110 may then be selected from the plurality of media files 110 comprised in a data storage unit 100 in accordance with the generated speech control command. It is also possible that not only one media file is selected, but several media files. When the speech control command "play [name of artist]" is used, the system can also select all the media files 110 of said artist. It is possible that at least one media file 110 or several media files 110 are selected meeting a predetermined requirement. The transcription comprised in the file identification data 111 assists to improve the rate of the speech recognition system because the phonetic transcription that may be generated by a person skilled in the art better matches the recorded voice than does an automatically generated transcription of the file identification data 111.

Furthermore, the voice-controlled system may further provide for the generation of the media files 110 containing media data and file identification data 111. The method of generating a media file 110 may include first providing a phonetic transcription of at least part of the file identification data. A phonetic transcription may then be added to the file identification data 111, so that the generated media file may be used in combination with a voice-controlled file selection system, where the media file is selected by using a voice command.

Figure 2:
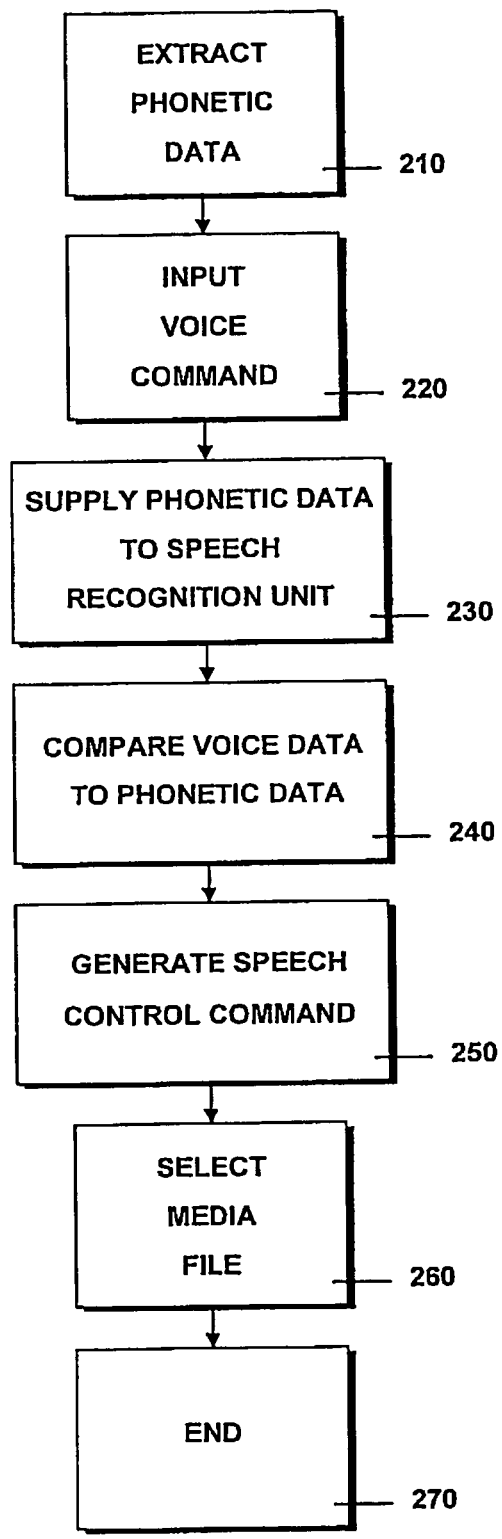
FIG. 2 is an example of a flowchart showing different steps for a voice-controlled selection of a media file according to one implementation of the invention.

In FIG. 2, the different steps for a voice-controlled selection of a media file 110 are shown. In a first step 210, all the phonetic transcriptions are extracted from the different media files 110 contained in the data storage unit 100. When the user wants to select one of the media files 110 or one of the chapters comprised in the media files 110, a voice command is input in step 220. To determine the correct meaning of the voice command, the phonetic transcriptions are supplied to the speech recognition unit 130 in step 230. The speech recognition unit 130 compares the voice command to the phonetic data extracted from the phonetic data extraction unit 120 (step 240). During the comparison, the most likely speech control command is generated by matching the phonetic data to the phonetic acoustic representation of the voice command and by selecting the best matching item (step 250). In a next step, the media file 110 or the media files 110 meeting the selection of the user is/are selected in correspondence with the generated speech control command (step 260). In step 270 the process ends.

When different phonetic data or different phonetic transcriptions are in the file identification data 111, all the different phonetic transcriptions may be extracted in step 210 and added to the list of phonetic annotations transmitted to the speech recognition unit 130.

Figure 3:
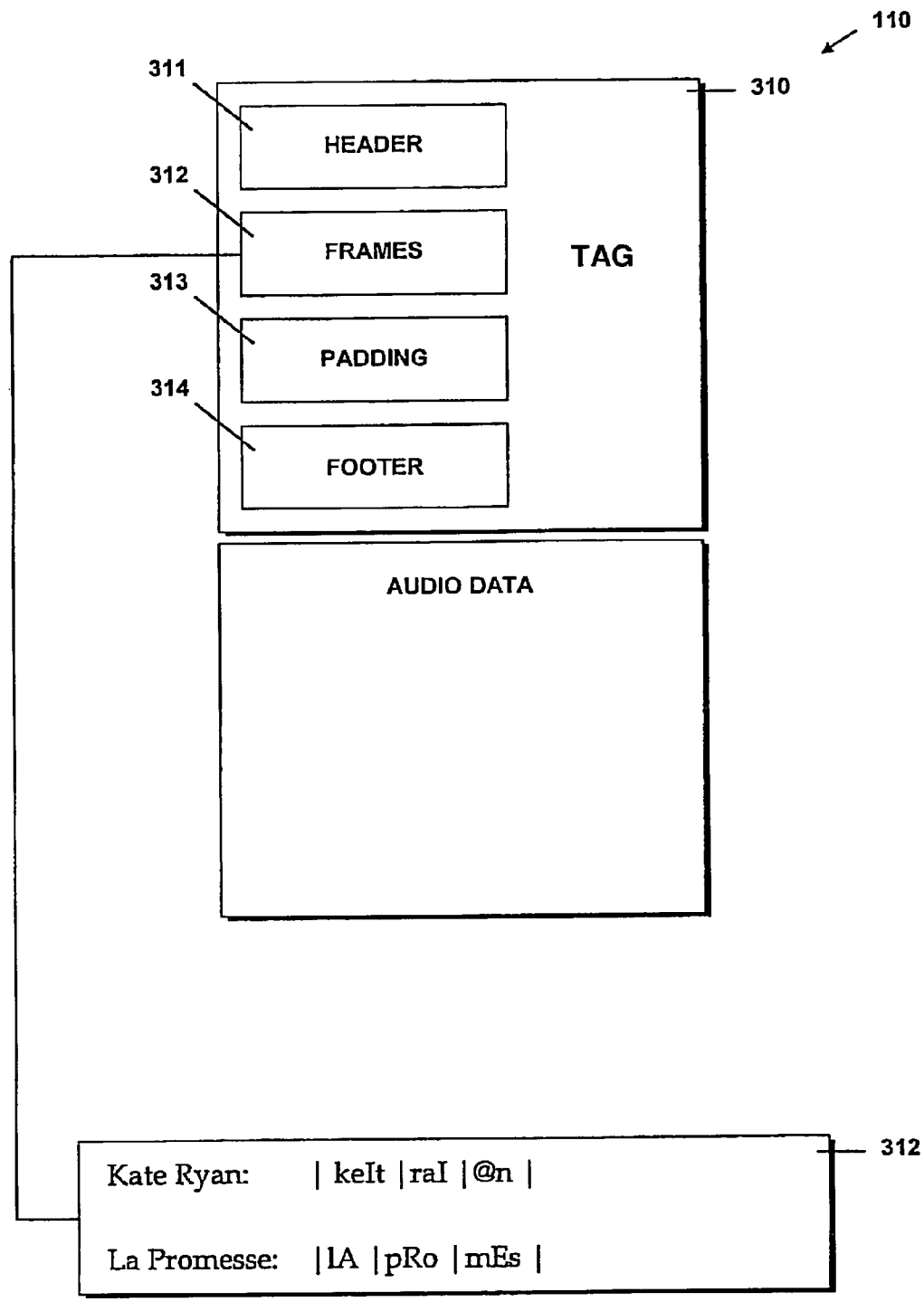
FIG. 3 is one example of a composition of a media file having phonetic transcriptions according to one implementation of the invention.

In FIG. 3, the composition of a media file 110 is shown in more detail. In the illustrated example, the media file 110 is stored in the MP3 format. The meta-data may be stored in an ID3v2 format. The MP3 format or MPEG layer 3 format is a data format that takes advantage of the fact that human ears do not hear all the frequencies that are normally in an audio or video file. All the information relating to the meta-data in the format may be stored in a tagging part 310 of the media file 110. The tagging part 310 may contain any kind of information and data, e.g., the title, album, performer, website, lyrics, pictures, etc. In the shown block scheme, the tag 310 includes a header 311, frames 312 and, optionally, a padding 313 and a footer 314. In the frames 312, the different pieces of information that should be incorporated into the file, be it pictures or the file identification data 111, may be stored. Illustrated at the bottom of FIG. 3, a part of a frame 312 is shown that includes phonetic transcriptions of the performer and the title of the file. In the illustrated example, the media file 110 contains a song of Kate Ryan with the title "La Promesse". As can be seen, the phonetic transcriptions of the singer and of the title are included as part of the file identification data 111. As illustrated, a computer-readable phonetic language SAMPA may be used. It should, however, be understood that any other computer-readable phonetic alphabet may be used. In the illustrated example, the name is an English pronounced name, whereas the title is a French pronounced term. In FIG. 3, the phonetic data are part of the audio file itself.

In other words, the speech recognition unit 130 should be able to recognize an English name even though the user pronounces the file name influenced by the German or French mother language. The different phonetic transcriptions can take into consideration that specific names may be pronounced differently, when users having different mother languages pronounce the same name. As a consequence, a phonetic transcription of one term of the file identification data could be generated by taking into consideration the mother language of the user. Based on the different phonetic transcriptions of one term of the file identification data, the speech recognition unit can more easily identify the correct voice command when the different phonetic transcriptions are matched to the acoustic input of the user.

For example, different phonetic transcriptions of the term "Kate Ryan" and of the term "La promesse" may then be included in the file identification data 111. For example, the system may utilize a phonetic transcription using phonetic rules of the French language of the name Kate Ryan. It could be possible that the user of the system thinks that the name is a French name, so that he or she could pronounce it "in a French way". Additionally, there could be provided phonetic transcriptions of the title of the song using German or English or Italian phonetic rules or phonetic rules of any other language. When the user with a mother language in German or English, pronounces the title of the song as he or she is used to using German or English phonetic rules, the system is able to correctly identify the meaning of the speech control command when the phonetic transcriptions comprised in the file identification data 111 are used.

In yet another example, let us assume for illustration purposes that the title of the media file that the user wants to select comprises the name of the city Paris. The transcription of this word is different when French phonetic rules are applied, because when the word "Paris" is pronounced by a French speaking person, the "s" at the end is not pronounced, whereas when the word "Paris" is used pronounced by an English speaking person, the "s" at the end is pronounced, which results in a completely different phonetic transcription. For speech recognition, even when people having different mother languages want to select a media file 110 using a voice command, different phonetic transcriptions may be utilized to consider phonetic rules of different languages. As previously described, these phonetic transcriptions may be incorporated into the file identification data 111. When different phonetic transcriptions of one term are stored in the file identification data 111, the different phonetic transcriptions can be generated by applying pronunciation rules of different languages for the term.

Additionally, when the mother language of the user of the system is known, the phonetic rules of this mother language can be used for the generation of the phonetic transcriptions. The phonetic transcriptions could contain a language identification part for identifying the language of the phonetic transcription.

Furthermore, it is possible that the user does not know the correct pronunciation of a proper name (e.g. the singer Sade). For further improving the speech recognition process "incorrect" pronunciations of names can also be considered by incorporating phonetic transcriptions taking into account these "incorrect" pronunciations.

The media files 110 may be audio or video files. As already mentioned above, the use of audio/video files downloaded from the Internet has become a widespread phenomenon. More and more often audio or video files are bought in electronic shops, e.g., iTunes® from Apple Computers, Inc. For a fast transmission of the media file 110 to the user, the media files 110 may be transmitted to a storage medium of the voice-controlled data system in a compressed format. The compressed storing of the media file makes it easy to transfer the file from one medium to the other by using a wired connection or a wireless connection.

While various examples of embodiments or implementations of the invention have been described, it will apparent to those of ordinary skill in the art that many more embodiments or implementations are possible within the scope of this invention. Accordingly, the invention is not to be restricted except in light of the attached claims and their equivalents.

What is claimed is:

1. A voice-controlled data system, comprising:
   a storage medium for storing media files, the media files comprising audio files and including associated file identification data for allowing the identification of the media files, where the file identification data associated with each audio file includes first phonetic information that corresponds to first phonetic rules for pronouncing an artist and a song title associated with the audio file and second phonetic information that corresponds to second phonetic rules for pronouncing the artist and the song title associated with the audio file, where the first phonetic information and the second phonetic information included in the file identification data are part of the audio file;
   a static vocabulary list including phonetic transcriptions of corresponding user commands;
   a phonetic data extraction unit for extracting the first phonetic information and the second phonetic information from the file identification data;
   a speech recognition unit for receiving voice data from a user, the voice data including a static vocabulary and a variable vocabulary, the static vocabulary including a user command and the variable vocabulary including the artist and the song title associated with a desired media file, where the speech recognition unit is configured to generate a control command based on comparing the received voice data to the phonetic transcriptions of the static vocabulary list and the first phonetic information and the second phonetic information extracted by the phonetic data extraction unit; and
   a media player for playing the media files, the media player configured to select a media file based on the control command received from the speech recognition unit.

2. The data system of claim 1, where the media files are stored on the storage medium in a compressed format.

3. The data system of claim 1 where the control command is generated based on first comparing a phoneme sequence in the voice data to determine a candidate list of best matching media files and then determining the most likely entry in the candidate list by matching acoustic representations of the entries in the candidate list to the voice data.

4. The data system of claim 1, where the media file is stored in the MP3 format and the first phonetic information and the second phonetic information is stored in a tagging part of the media file.

5. The data system of claim 4, where the tagging part of the media file comprises an ID3 tag.

6. The data system of claim 1, where the first phonetic rules correspond to a first language and the second phonetic rules correspond to a second language.

7. The data system of claim 6, where the first phonetic information comprises a first identifier that identifies the first language, and the second phonetic information comprises a second identifier that identifies the second language.

8. A method for a voice-controlled selection of a media file stored on a data storage unit including a plurality of media files, the media files comprising audio files and including media data and associated file identification data, where the file identification data associated with each audio file includes first phonetic information that corresponds to first phonetic rules for pronouncing an artist and a song title associated with the audio file and second phonetic information that corresponds to second phonetic rules for pronouncing the artist and the song title associated with the audio file, where the first phonetic information and the second phonetic information included in the file identification data are part of the audio file, the method comprising:
   inputting voice data for selecting one of the media files, the voice data including a static vocabulary and a variable vocabulary, the static vocabulary including a user command and the variable vocabulary including the artist and the song title associated with a desired media file;
   supplying the voice data to a speech recognition unit;
   providing a static vocabulary list including phonetic transcriptions of corresponding user commands;
   extracting the first phonetic information and the second phonetic information from the file identification data;
   supplying the phonetic transcriptions from the static vocabulary list and the first phonetic information and the second phonetic information extracted from the file identification data to the speech recognition unit as recognition vocabulary;
   generating a control command by comparing the input voice data to the phonetic transcriptions and the extracted phonetic information;
   using a media file player to select a media file from the data storage unit in accordance with the generated control command; and
   executing a user command on the media file in accordance with the generated control command.

9. The method of claim 8, wherein the user commands of the static vocabulary list are selected from the group consisting of play, stop, go to, forward, and backwards.

10. The method of claim 8, where the step of generating a control command includes the step of comparing a phoneme sequence in the voice data to determine a candidate list of best matching media files and further determining the most likely entry in the candidate list by matching acoustic representations of the entries in the candidate list to the voice data.

11. The method of claim 8, where the media file is stored in the MP3 format and the first phonetic information and the second phonetic information is stored in a tagging part of the media file.

12. The method of claim 11, where the tagging part of the media file comprises an ID3 tag.

13. The method of claim 8, where the first phonetic rules correspond to a first language and the second phonetic rules correspond to a second language.

14. The method of claim 13, where the first phonetic information comprises a first identifier that identifies the first language, and the second phonetic information comprises a second identifier that identifies the second language.

\* \* \* \* \*